(12) United States Patent
Chew (10) Patent No.: US 9,996,113 B2
(45) Date of Patent: Jun. 12, 2018

(54) TECHNIQUES FOR SOLAR CELL MANAGEMENT FOR COMPUTING DEVICES

(71) Applicant: Intel Corporation, Santa Clara, CA (US)

(72) Inventor: Yen Hsiang Chew, Penang (MY)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/129,536

(22) PCT Filed: Oct. 3, 2012

(86) PCT No.: PCT/US2012/000465
§ 371 (c)(1),
(2) Date: Dec. 26, 2013

(87) PCT Pub. No.: WO2013/055387
PCT Pub. Date: Apr. 18, 2013

(65) Prior Publication Data
US 2014/0223201 A1    Aug. 7, 2014

(30) Foreign Application Priority Data

Oct. 3, 2011  (MY) .......................... PI 2011004735

(51) Int. Cl.
*G06F 1/30*   (2006.01)
*G06F 1/16*   (2006.01)
(Continued)

(52) U.S. Cl.
CPC ............ *G06F 1/1635* (2013.01); *G06F 1/169* (2013.01); *G06F 1/263* (2013.01); *G06F 3/0421* (2013.01)

(58) Field of Classification Search
None
See application file for complete search history.

(56) References Cited

U.S. PATENT DOCUMENTS

| 8,022,571 B2 * | 9/2011 | Warren ..................... H02J 7/35 307/64 |
| 2006/0125629 A1 * | 6/2006 | Takahashi .......... H04N 1/00307 340/539.1 |

(Continued)

FOREIGN PATENT DOCUMENTS

| JP | 2011109770 A | 6/2011 |
| KR | 10-2010-0053010 A | 5/2010 |
| WO | 2010083460 A | 7/2010 |

OTHER PUBLICATIONS

International Search Report and Written Opinion, dated Feb. 28, 2013, Application No. PCT/US2012/000465, Filed Date: Oct. 3, 2012, pp. 11.
Search Report and Office Action received for Taiwanese Patent Application No. 101135612, dated Nov. 17, 2015, 7 pages including 1 page English translation.
Extended European Search Report received for European Patent Application No. 12839828.6, dated Dec. 21, 2015, 7 pages.

*Primary Examiner* — Paul J Yen (57) ABSTRACT

Embodiments of an apparatus, system and method are described for managing one or more solar cells for a mobile computing device. An apparatus may comprise, for example, a power management module operative to manage a power output received from a plurality of solar cells and an interface management module operative to identify one or more solar cells having a lower power output than other solar cells and to adjust one or more graphical user interface (GUI) elements based on the identification. Other embodiments are described and claimed.

18 Claims, 7 Drawing Sheets

(51) Int. Cl.
*G06F 1/26* (2006.01)
*G06F 3/042* (2006.01)

(56) References Cited

U.S. PATENT DOCUMENTS

| | | |
|---|---|---|
| 2008/0057355 A1 | 3/2008 | Ajiki |
| 2008/0084178 A1 | 4/2008 | Dowd et al. |
| 2008/0094025 A1 | 4/2008 | Rosenblatt et al. |
| 2010/0155575 A1 | 6/2010 | Lundin |
| 2010/0287388 A1 | 11/2010 | Suzuki |
| 2010/0311473 A1 | 12/2010 | Deshpande et al. |
| 2011/0074337 A1* | 3/2011 | Adachi ............... H01M 10/465 320/101 |
| 2011/0164063 A1* | 7/2011 | Shimotani ............ G06F 3/0416 345/661 |
| 2011/0292438 A1* | 12/2011 | Inami ................ H04N 1/00413 358/1.15 |
| 2012/0151240 A1* | 6/2012 | Robinson ............... G06F 1/263 713/340 |

\* cited by examiner

TECHNIQUES FOR SOLAR CELL MANAGEMENT FOR COMPUTING DEVICES

BACKGROUND

The performance and capabilities of modern computing systems have increased rapidly in recent years. Many computing system today include one or more processors, memory, wireless connectivity, displays and other components requiring electrical power. The number and type of capabilities and components in modern computing systems continues to increase, which often results in increased power consumption. Additionally, modern mobile computing systems are often used in a variety of different locations, usage scenarios and orientations which may result in the computing systems being used in ways that may block or obscure one or more elements displayed on a display or may increase the difficulty of interacting with elements displayed on the display. As a result, it is desirable to improve power management and interface management for a computing system. Consequently, there exists a substantial need for techniques to dynamically monitor and manage a plurality of solar cells for a computing system.

DETAILED DESCRIPTION

The embodiments are generally directed to techniques for managing solar cells for a computing device. Various embodiments provide a system, apparatus and method that include a power management module operative to manage a power output received from a plurality of solar cells and an interface management module operative to identify one or more solar cells having a lower power output than other solar cells and to adjust one or more graphical user interface (GUI) elements based on the identification. Other embodiments are described and claimed.

With the progression over time toward the use of computing devices of decreasing size and cost, the space available for components designed to provide power for the devices in a mobile computing device platform is becoming increasingly limited. Modern mobile computing devices, such as tablet computers, handheld computing devices, smartphones, laptop computers and netbook computers, require mobile power to provide a robust user experience. Current mobile computing devices include rechargeable batteries that offer mobile power for a limited time. These batteries typically require charging from time to time to ensure continued functionality of the mobile computing device. Conventional devices require a connection to an alternating current (AC) power supply or a dedicated direct current (DC) charging device to recharge the internal batteries which may be unavailable at all times or may be inconvenient for the user to carry.

Modern computing devices, such as tablet computers, are held and manipulated by a user during use. For example, tablet computers are often held as a user would traditionally hold a book or magazine. Modern mobile computing devices fail to provide adequate methods for the way in which the device is being held. In present mobile computing devices, a user may not realize that they are blocking information displayed on a display or certain interactive elements on a display may not be conveniently located based on how a user is holding the device. In various embodiments, this may lead to a poor user experience.

In one embodiment, a mobile computing system may employ solar cells to generate power and to act as sensors to assist in determining how a device is being held. In various embodiments, a holding position may be determined based on one or more solar cells being block. For example, a users hand may block one or more solar cells, resulting in the cells receiving less light and therefore generating less energy. Additionally, the unblocked solar cells may be operative to provide power to one or more components of the computing device. Therefore, some embodiments described herein are directed to techniques to manage a plurality of solar cells for a mobile computing device. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
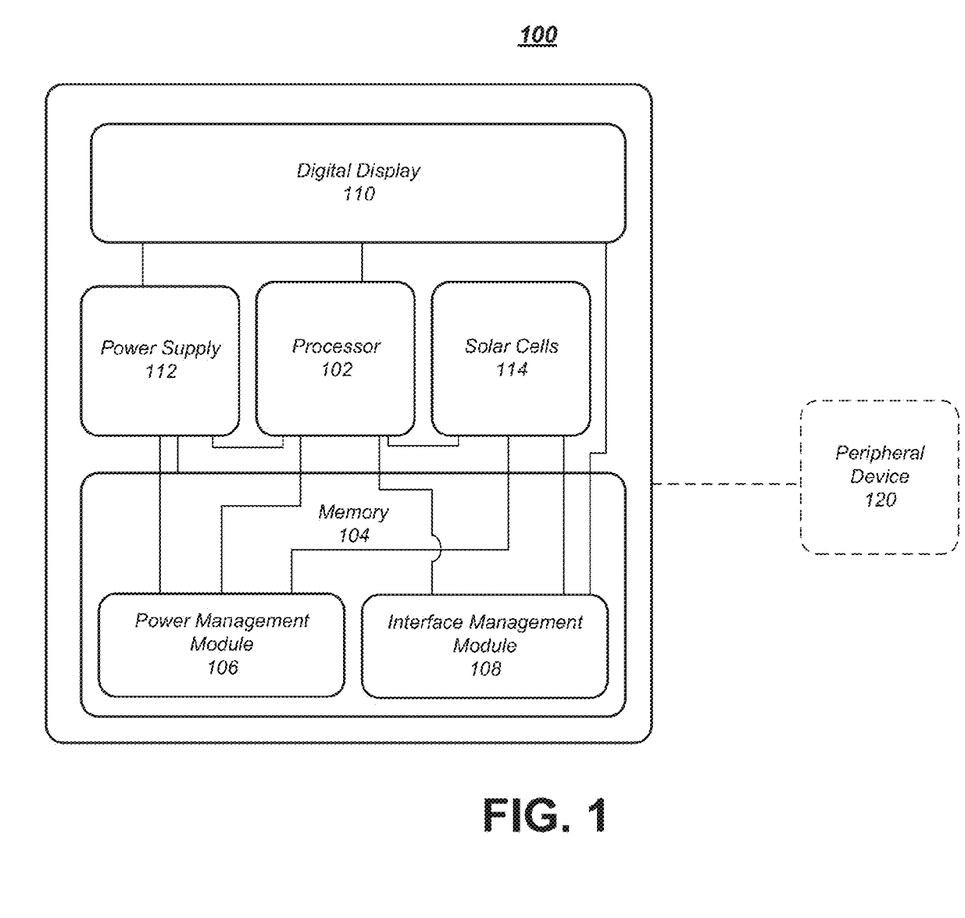
FIG. 1 illustrates one embodiment of a first system.

FIG. 1 illustrates a block diagram of one embodiment of a mobile computing device 100. In various embodiments, the mobile computing device 100 may comprise multiple nodes, element or components. A node, element or component generally may comprise any physical or logical entity in the mobile computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the mobile computing device 100 may comprise a tablet computer, handheld computer, personal digital assistant (PDA), cellular telephone, combination cellular telephone/PDA, smartphone, laptop computer, ultra-laptop computer, portable computer, personal computer (PC), notebook PC, netbook, pager, messaging device, media player, digital music player, or other suitable mobile computing device. Various embodiments described herein include reference to a notebook computer. The embodiments are not limited in this context.

Mobile computing device 100 may comprise a device operative to form part of a wired communications system, a wireless communications system, or a combination of both. For example, the mobile computing device 100 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 100 illustrates one possible node in some embodiments. In various embodiments, mobile computing device 100 may include processor 102, memory 104, power management module 106, interface management module 108, digital display 110, power supply 112, solar cells 114 and peripheral device 120. While a limited number and arrangement of components are shown in FIG. 1 for purposes of illustration, it should be understood that mobile computing device 100 may include any number or arrangement of components and still fall within the described embodiments. For example, mobile computing device 100 may additionally include, in some embodiments, memory containing instructions to be executed by one or more multi-core processors for example. The embodiments, however, are not limited to the elements or the configuration shown in this figure. Additional components for mobile computing device 100 are discussed in further detail below with reference to FIG. 4.

Processor 102 may comprise any suitable electric device, semiconductor device, system on chip or other component in some embodiments. For example, processor 102 may comprise a multi-core processor in various embodiments. In some embodiments, processor 102 may include or comprise one or more radio modules or combination transmitter/receiver (e.g. transceiver) devices. In various embodiments, the transceiver device may comprise a device that has both a transmitter and a receiver that are combined and share common circuitry or a single housing. For example, in some embodiments, the transceiver may be operative to enable wireless communication capabilities for mobile computing device 100. Other embodiments are described and claimed.

Memory 104 may comprise any suitable physical device operative to store data, programs, sequences of instructions or other information on a temporary or permanent basis for use in mobile computing device 100 in some embodiments. For example, memory 104 may comprise volatile or non-volatile memory, RAM, ROM, virtual memory, solid state disk drive or a hard disc drive for example. The embodiments are not limited in this context.

In various embodiments, power management module 106 and interface management module 108 may comprise software, firmware, hardware or any suitable combination of software, firmware or hardware. In one embodiment, for example, power management module 106 and interface management module 108 may comprise logic stored in memory 104 to be executed by a processor to perform solar cell management operations. In some embodiments, power management module 106 and interface management module 108 may comprise firmware or an embedded controller implemented in an operating system of computing device 100. While shown as part of memory 104 in FIG. 1, it should be understood that power management module 106 and interface management module 108 could be implemented anywhere within computing device 100 and still fall within the described embodiments. Other embodiments are described and claimed.

In some embodiments, display 110 may comprise any suitable visual interface for displaying content to a user of the mobile computing device 100. In one embodiment, for example, the display 110 may be implemented by a liquid crystal display (LCD) or a touch-sensitive color LCD screen. The touch-sensitive LCD may be responsive to human touch or may be used with a stylus and/or a handwriting recognizer program in some embodiments. Display 110 may comprise a digital touchscreen display arranged to occupy a substantial portion of a first side of a computing device in some embodiments.

Power supply 112 may comprise any device suitable for providing electrical power to computing device 100 in various embodiments. For example, power supply 112 may comprise an AC power supply or a DC power supply. In some embodiments, power supply 112 may comprise a battery or other energy storage device capable of storing and providing power to computing device 100. Other embodiments are described and claimed.

In various embodiments, solar cells 114 may comprise any solid-state electrical device that is operative to convert the energy of light directly into electricity by the photovoltaic effect. For example, solar cells 114 may comprise photovoltaic cells or photoelectric cells. In some embodiments, assemblies of solar cells 114 may be combined to make solar modules that are used to capture energy from sunlight in the form of solar panels. The energy generated from these solar modules, referred to as solar power, is an example of solar energy in some embodiments. While various embodiments described herein refer to the use of solar cells 114, it should be understood that any suitable sensor or device that is operative to convert the energy of light into electrical power could be used and still fall within the described embodiments.

Peripheral device 120 may comprise an external device that is coupled to computing device 100 in some embodiments. For example, peripheral device 120 may comprise any device attached to computing device 100, but not part of it, that is more or less dependent on computing device 100. In some embodiments, peripheral device 120 may be operative to expand the capabilities of computing device 100. Examples of peripheral device 120 include but are not limited to computer printers, image scanners, tape drives, microphones, loudspeakers, webcams, and digital cameras. Other embodiments are described and claimed.

Figure 2A:
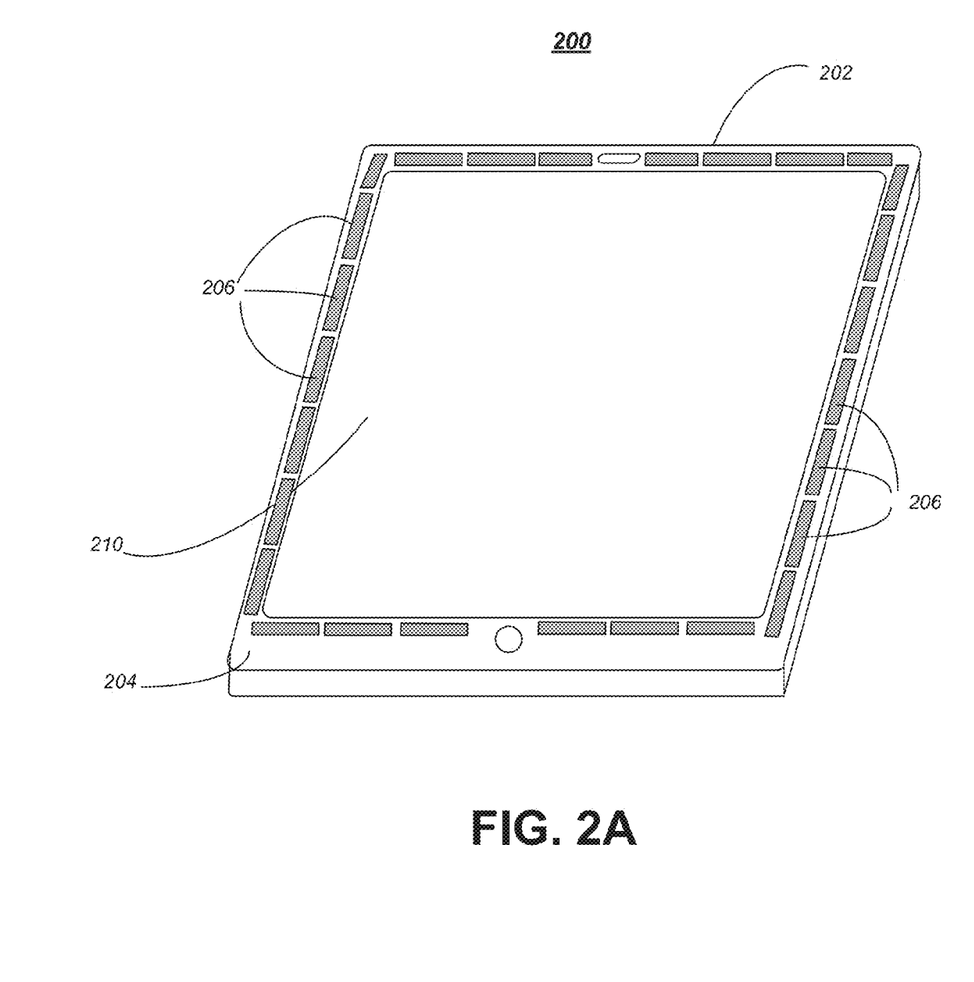
FIG. 2A illustrates one embodiment of a second system.

FIG. 2A illustrates a block diagram of one embodiment of a mobile computing device 200. Mobile computing device 200 may be the same or similar to mobile computing device 100 in various embodiments. In some embodiments, mobile computing device 200 may comprise a tablet computing device, but the embodiments are not limited in this respect. As shown, mobile computing device may include enclosure 202, bezel 204, one or more solar cells 206 and display 210. Although FIG. 2A may show a limited number of nodes, elements and components by way of example, it can be appreciated that more or less nodes, elements or components may be employed for a given implementation.

In various embodiments, the solar cells 206 and display 210 may be the same or similar to the solar cells 114 and display 110 of FIG. 1. As shown in FIG. 2A, the solar cells 206 may be arranged around or proximate to display 210 in some embodiments. For example, solar cells 206 may be arranged substantially around a perimeter of display 210 in various embodiments.

Various embodiments describe the use of a plurality of solar cells 206. It should be understood that any number, type or arrangement of solar cells 206 could be used and still fall within the described embodiments. One skilled in the art will understand that tradeoffs exist between using a large number of solar cells 206 which may increase the accuracy or precision with which a holding position or orientation can be determined and a smaller number of solar cells 206 which may result in increased power generation.

In some embodiments, solar cells 206 may be affixed to or integrated into a top surface of enclosure 202. For example, solar cells 206 may be attached to a top surface of the enclosure 202 or may be protected under a glass or other surface that forms part of enclosure 202. Enclosure 202 may comprise any suitable housing arranged to support or protect any or all of the components of computing devices 200 in various embodiments, including but not limited to display 110, power supply 112, processor 102, memory 104 and solar cells 114. In some embodiments, enclosure 202 may take the form of a notebook computer enclosure as shown in FIG. 2A, though the embodiments are not limited in this context. In various embodiments, enclosure 202 may include a bezel 204. Bezel 204 may comprise a front portion of enclosure 202 that surrounds display 210 in some embodiments.

Solar cells 206 may be selected to have aesthetic value in the system design in some embodiments. For example, solar cells 206 may be selected to have a color that is similar to or substantially the same as that of bezel 204, display 210 or other portions of enclosure 202. In this manner, solar cells 206 may blend into the system design. In other embodiments, solar cells 206 may be selected to have different colors that are selected to accent or highlight different portions of computing device 200. Other embodiments are described and claimed.

Returning to FIG. 1, in various embodiments, power management module 106 may be operative to manage a power output received from a plurality of solar cells 114. For example, power management module 106 may be operative to couple the power output to one or more components of the computing device 100. In various embodiments, the power output may comprise light energy that was converted by the solar cells 114 into electricity or electrical energy. In some embodiments, the electricity generated by the solar cells 114 may be managed or distributed by power management module 106. For example, the electricity may be provided to power supply 112 (e.g. energy storage device 112) to charge the power supply and prolong the mobile usefulness of computing device 100. In other embodiments, power management module 106 may be operative to provide the power output directly to any other components of computing device 100 such as processor 102, memory 104 or display 110 for use in operating or powering these components or to supplement the power supplied to these systems. The embodiments are not limited in this respect.

Figure 2B:
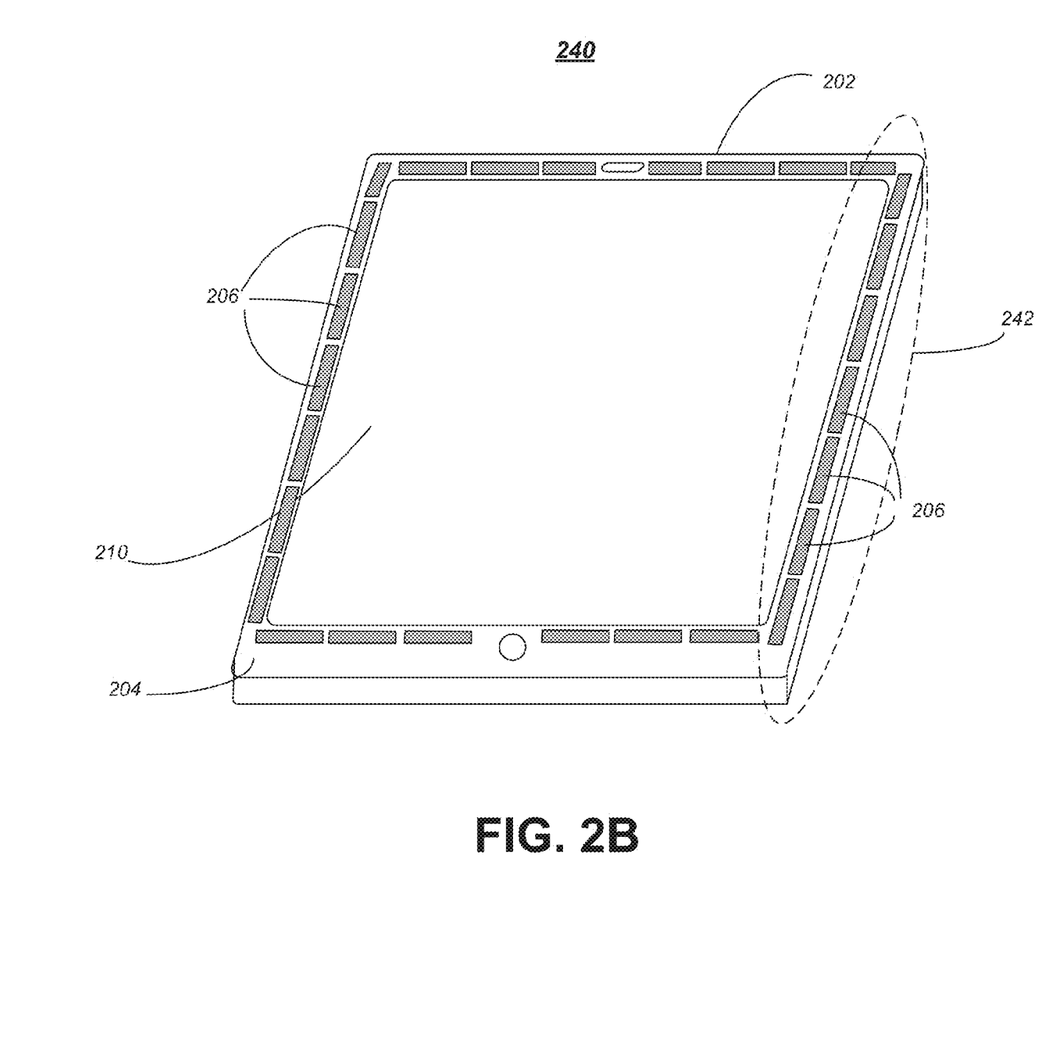
FIG. 2B illustrates one embodiment of a third system.

In some embodiments, power management module 106 may be operative to couple an output from a first group of solar cells to one or more first components and an output from a second group of solar cells to one or more second components. For example, power management module 106 may be operative to form one or more groups or subsets of solar cells 114. FIG. 2B illustrates a block diagram of one embodiment of a mobile computing device 240 that may be the same or similar to computing device 200 of FIG. 2A where like elements are similarly numbered. As shown in FIG. 2B, a first group 242 of solar cells 206 may comprise the cells 206 encircled by the dashed line. In some embodiments, the remaining cells may form a second group of cells 206. A limited number and arrangement of groupings are shown for purposes of illustration and not limitation.

In various embodiments, each grouping of solar cells 206 may be used to provide power to different devices or components of computing device 240. For example, grouping 242 of solar cells 206 may be coupled to display 210 to power the display 210. The remaining solar cells 206 not in grouping 242 may form a second group and this second group may be coupled to energy storage device 112. Other embodiments are described and claimed.

Interface management module 108 may be operative to identify one or more solar cells 114 having a lower power output than other solar cells 114 and to adjust one or more graphical user interface (GUI) elements based on the identification in some embodiments. For example, if one or more solar cells 114 are covered or otherwise obscured from light, they may produce a lower output power compared to solar cells 114 that are not covered or obscured. In some embodiments, a users hand or hands may cover one or more solar cells 114 when holding computing device 100, resulting in decreased output power for the covered solar cells 114. Based on the decreased or lower output power, interface management module 108 may be operative to infer a holding position or a position of a user's hands on the computing device 100 in some embodiments. In various embodiments, interface management module 108 may be operative to determine an orientation of the apparatus based on the one or more solar cells having a lower power output than other solar cells. Other embodiments are described and claimed.

In various embodiments, a GUI view may comprise a user interface arranged to allow users to interact with computing device 100 using images displayed on display 110 rather than using text commands. In some embodiments, the GUI view may comprise one or more GUI elements. Examples of GUI elements may include but are not limited to icons, text, images, multimedia information or any other data or elements visually representing information stored on or accessible to computing device 100.

Figure 2C:
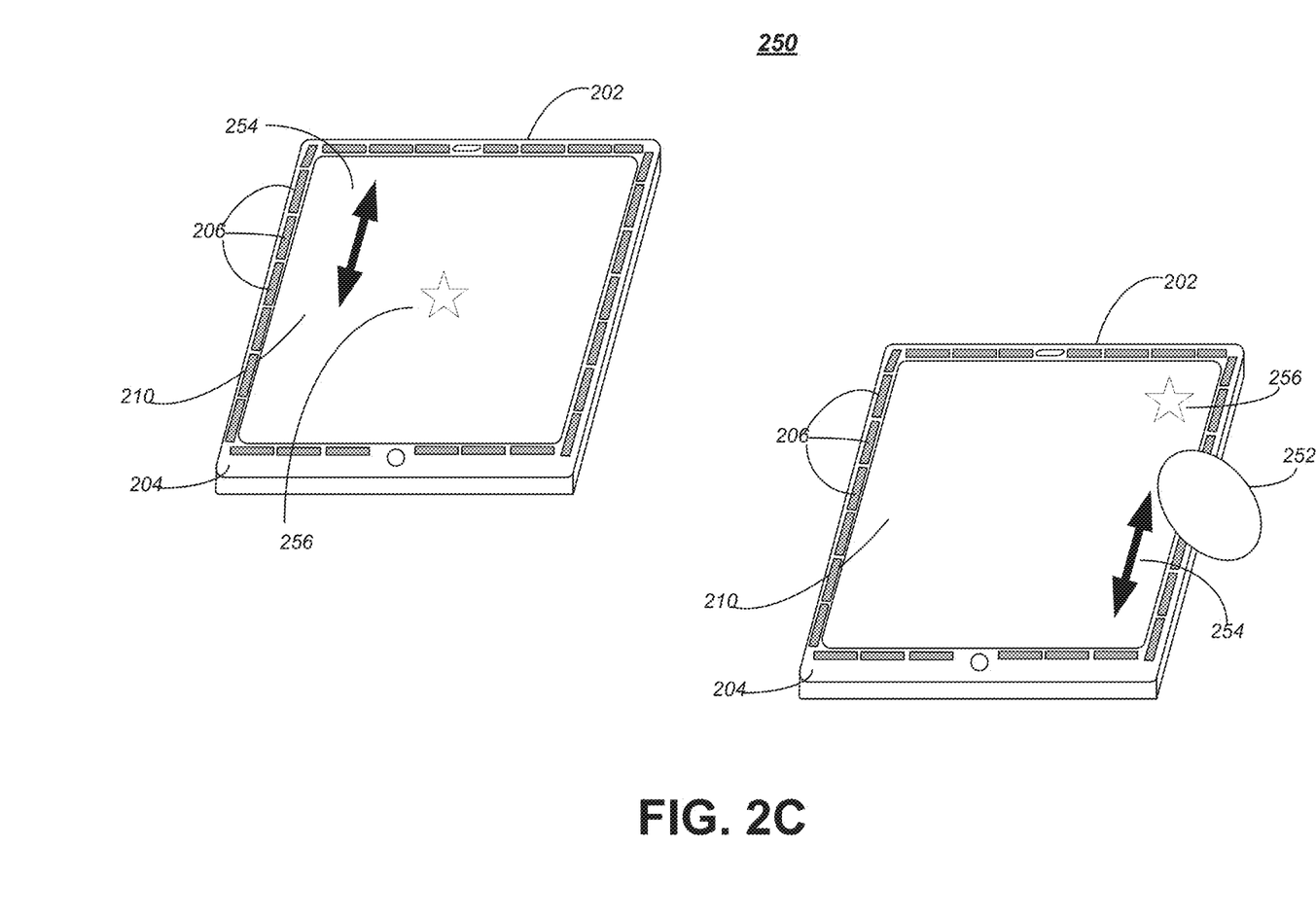
FIG. 2C illustrates one embodiment of a fourth system.

The interface management module 108 may be operative to arrange one or more GUI elements proximate to the one or more solar cells having a lower power output than other solar cells in some embodiments. FIG. 2C illustrates a block diagram of an embodiment of mobile computing devices 250 that may be the same or similar to computing device 200 of FIG. 2A where like elements are similarly numbered. As shown in the left of FIG. 2C, mobile computing device 250 may include one or more GUI elements 254 and 256 in a GUI view on display 210. In the illustrated embodiment, GUI element 254 may comprise a navigational element comprising directional arrows and GUI element 256 may comprise an icon though the embodiments are not limited in this respect.

In various embodiments, mobile computing device 250 may render the GUI elements 254 and 256 on display 210 as shown. However, in some embodiments as shown in the right of FIG. 2C, mobile computing device 250 (e.g. interface management module 108) may adjust, relocate or otherwise change the GUI elements 254 and 256 based on one or more solar cells having a lower power output than other solar cells. For example, element 252 illustrates a blocking of several solar cells 206. In some embodiments, this blockage or covering may comprise a human hand holding computing device 250. In various embodiments, the solar cells 206 covered at 252 may receive less light and may generate less output power as a result. As a result of this effect, interface management module 108 may be operative to determine the location of the user's hand or other material covering one or more solar cells 206 and may arrange one or more GUI elements, such as navigational GUI element 254 or icon 256, proximate to the one or more solar cells having a lower power output than other solar cells as shown on the right of FIG. 2C.

In various embodiments, one or more GUI elements may be generated based on the detected hand position 252. In some embodiments GUI elements that are related to user interaction or control may appear on display 210 when a users hand is detected 252 holding the computing device 250. For example, a cursor, navigational controls, menus or other suitable GUI elements that may be of interest to a user may appear based on the detected hand position 252. Other embodiments are described and claimed.

Figure 2D:
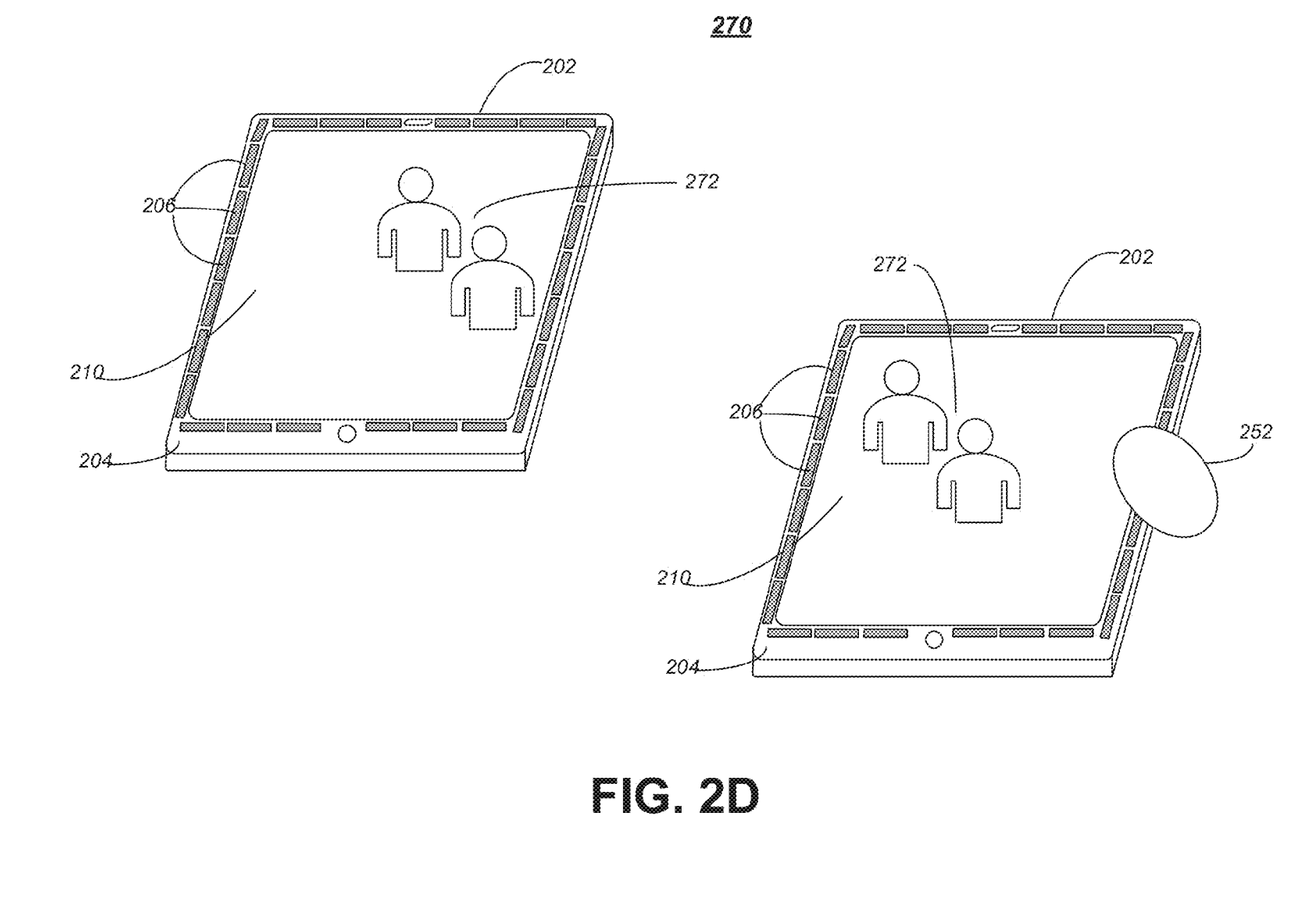
FIG. 2D illustrates one embodiment of a fifth system.

Interface management module 108 may be operate to arrange one or more primary GUI elements away from the one or more solar cells having a lower power output than other solar cells in some embodiments. For example, FIG. 2D illustrates a block diagram of an embodiment of mobile computing devices 270 that may be the same or similar to computing device 200 of FIG. 2A where like elements are similarly numbered. As shown in the left of FIG. 2D, GUI element 272 may comprise a primary GUI element such as a media stream or other content of interest to a user. When a users hand is detected 252 as shown in the right of FIG. 2D, interface management module 108 may be operative to relocate or otherwise manipulate primary GUI element 272 to avoid any interference caused by the blockage at 252. One skilled in the art will understand that the primary GUI element may comprise any GUI element presented in a GUI view that should not be obstructed or does not to be arranged proximate to a users hand 252. The embodiments are not limited in this respect.

In various embodiments, interface management module 108 may be operative to select GUI elements that are manipulated based on a detected covering of solar cells based on a predefined set of rules or based on a set of rules established by a user. For examples, a predefined or default set of rules may identify GUI elements utilized for navigation or control of the computing device as elements that are relocated to be proximate to a detected users hand location. In some embodiments, users may specify what type of GUI elements should be manipulated.

In some embodiments, power management module 106 may be operative to adjust or rearrange the grouping of solar cells 206 based on the detected hand position 252. For example, a power priority may be established such that certain components are given priority for power received from solar cells 206 over other components. In some embodiments, if any of the cells 206 that are covered 252 were previously coupled to energy storage device 112, cells 206 that were assigned to other components may be reassigned or coupled to energy storage device 112 to ensure that this device is received adequate power despite the blockage 252. Other embodiments are described and claimed.

In various embodiments, power management module 106 may be operative to change a performance state of a component of the computing device 100 based on the detected power output from solar cells 114. For example, a performance state of the processor 102 may be automatically changed based on changes in the power available from solar cells 114. In various embodiments, changing the performance state may comprise throttling the processor 102 if the power available from the solar cells 114 decreases. By changing a performance state of a component, the power management module 106 may be able to adjust the power consumption of the computing device 100 to help prevent undue power usage when adequate reserves are not available.

Utilizing the solar cells 114 for the dual functionality of power generation and sensing of a holding position or orientation of a computing device provides advantages not realized by prior computing systems. For example, the system described herein may be operative to dynamically distinguish between left and right hand users. The system may also be operative to dynamically adjust a GUI view based on the way the device is being used which provides a robust and enjoyable user experience. In some embodiments, this dynamical control may simplify user interaction with various GUI elements while providing power for the computing device at the same time. Utilizing the solar cells 114 as sensors to detect a hand position as described herein may also avoid the need to include additional sensors on computing device 100 to detect the hand holding position that may reduce power draw and manufacturing cost for the system 100. In some embodiments, users may be appreciative of the fact that their device is partially powered by "green energy" which is good for the environment. In addition, solar cell design (e.g. color and looks) may be aesthetically pleasing to some users. One skilled in the art will understand that many other advantages result from the described embodiments and are not limited to this discussed herein.

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
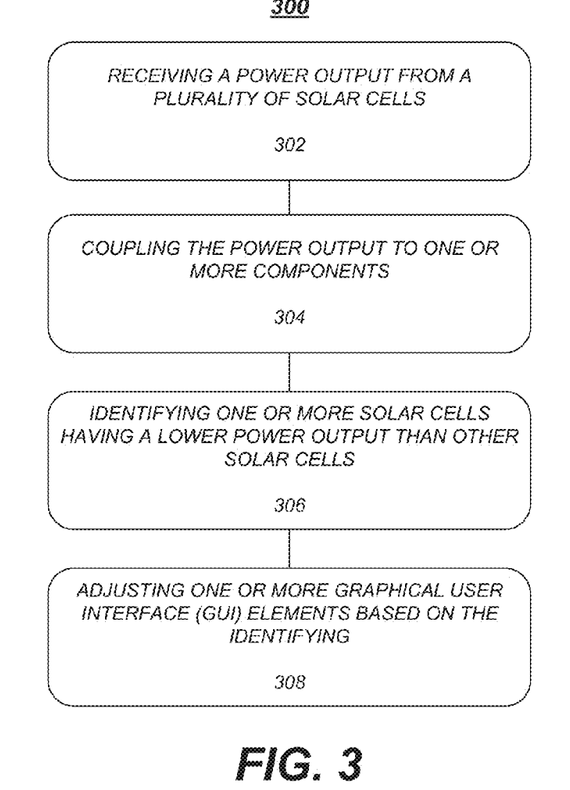
FIG. 3 illustrates one embodiment of a flow diagram.

FIG. 3 illustrates one embodiment of a logic flow 300. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or non-transitory computer-readable instructions to be executed by a logic device (e.g., computer, processor). Logic flow 300 may describe the dynamic solar cell management described above with reference to FIGS. 1, 2A, 2B, 2C and 2D. Other embodiments are described and claimed.

A power output may be received from a plurality of solar cells at 302. For example, power management module 106 may be operative to receive a power output from solar cells 114. At 304, the power output may be coupled to one or more components. For example, power management module 106 may be operative to couple the power output from solar cells 114 to one or more of power supply 112, processor 102, display 110 or any other suitable components.

In various embodiments, one or more solar cells having a lower power output than other solar cells may be identified at 306. For example, interface management module 108 may be operative to identify one or more solar cells 114 that are not producing as much output power as other solar cells. In some embodiments, this reduced output may result from the solar cells 114 being blocked by a user's hand and not receiving as much light as solar cells 114 that are not blocked.

At 308, one or more graphical user interface (GUI) elements may be adjusted based on the identifying. For example, interface management module 108 may be operative to arrange one or more GUI elements 254, 256 proximate to the one or more solar cells having a lower power output than other solar cells 252, arrange one or more navigational GUI elements 254 proximate to the one or more solar cells having a lower power output than other solar cells 252 or arrange one or more primary GUI elements 272 away from the one or more solar cells having a lower power output than other solar cells 252. Other embodiments are described and claimed.

In some embodiments, the power output may be coupled to one or more of an energy storage device, a processor, a memory, a digital display or one or more peripheral devices. For example, power management module 106 may be operative to couple the output power from one or more of solar cells 114 to one or more of power supply 112, memory 104, processor 102, display 110 or peripheral device 120. In some embodiments, the solar cells may be grouped into subsets and an output from a first group or subset of solar cells may be coupled to one or more first components and an output from a second group or subset of solar cells may be coupled to one or more second components. For example, group 242 of solar cells 206 may be coupled to processor 102 and the remaining solar cells 206 may be coupled to energy storage device 112.

In various embodiments, an orientation of a computing device may be determined based on the one or more solar cells having a lower power output than other solar cells. For example, interface management module 108 may be operative to determine an orientation of computing device 100 based on the detected hand position of a user. The embodiments are not limited in this context.

Figure 4:
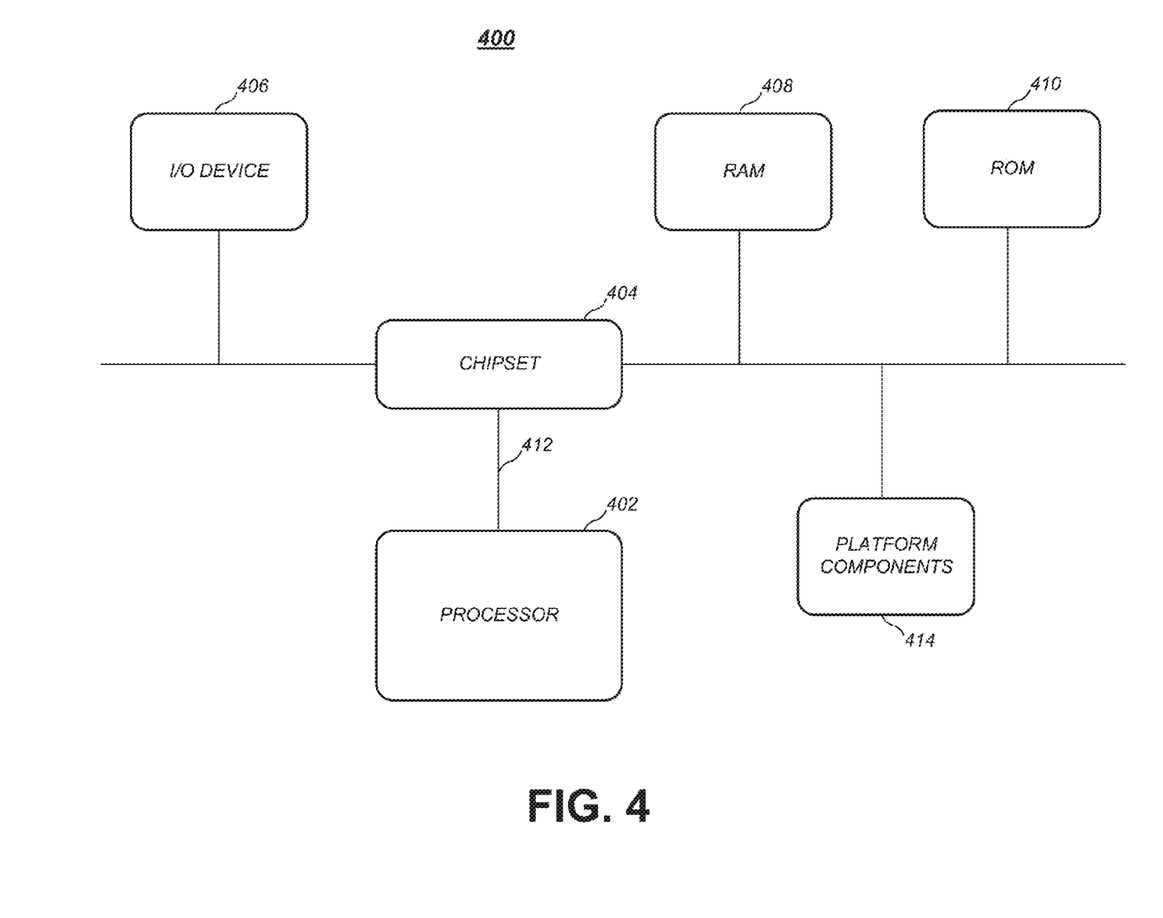
FIG. 4 illustrates one embodiment of a sixth system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard (physical or virtual/soft), mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a power management module operative to manage a power output received from a plurality of solar cells included in a computing device, the power management module to form first and second subsets of the plurality of solar cells, and to couple a power output received from the first subset of the plurality of solar cells to a first component of the computing device and couple a power output received from the second subset of the plurality of solar cells to a second component of the computing device; and
    an interface management module operative to identify one or more solar cells in the first subset having a lower power output than one or more other solar cells in the second subset and to adjust one or more graphical user interface (GUI) elements based on the identification of the one or more solar cells having lower power output and based on a set of rules established by a user specifying types of GUI elements to adjust, the power management module to add at least one of the one or more other solar cells in the second subset to the first subset of the plurality of solar cells to power the first component based on the identification of the one or more solar cells in the first subset having lower power output.

2. The apparatus of claim 1, at least two of the plurality of solar cells arranged around at least a portion of a perimeter of a digital display of the computing device.

3. The apparatus of claim 1, the first and second components comprising one or more of an energy storage device, a processor, a peripheral device, a memory or a digital display.

4. The apparatus of claim 1, the power management module operative to couple the power output received from the first subset to one or more first components and the power output received from the second subset to one or more second components based on a power priority.

5. The apparatus of claim 1, the interface management module operative to determine an orientation of the computing device based on the one or more solar cells having a lower power output than one or more other solar cells.

6. The apparatus of claim 1, the interface management module operative to arrange one or more GUI elements proximate to the one or more solar cells having a lower power output than one or more other solar cells.

7. The apparatus of claim 1, the computing device comprising:
    a processor operative to execute the power management module or the interface management module.

8. A method, comprising:
    receiving a power output from a plurality of solar cells included in a computing device;
    forming first and second subsets of the plurality of solar cells;
    coupling a power output received from the first subset to a first component of the computing device and a power output received from the second subset to a second component of the computing device;
    identifying one or more solar cells in the first subset having a lower power output than one or more other solar cells in the second subset;
    establishing a set of rules by a user specifying types of graphical user interface (GUI) elements to adjust based on the identifying;
    adjusting one or more GUI elements based on the identifying and the establishing; and
    adding at least one of the one or more other solar cells in the second subset to the first subset to power the first component based on the identifying of the one or more solar cells in the first subset having a lower power output.

9. The method of claim 8, the first and second components comprising:
    one or more of an energy storage device, a processor, a memory, a digital display and one or more peripheral devices.

10. The method of claim 8, comprising:
    coupling the power output received from the first subset to one or more first components based on a power priority; and coupling the power output received from the second subset to one or more second components based on the power priority.

11. The method of claim 8, comprising:
determining an orientation of the computing device based on the one or more solar cells having a lower power output than one or more other solar cells.

12. The method of claim 8, comprising:
arranging one or more GUI elements proximate to the one or more solar cells having a lower power output than one or more other solar cells.

13. The method of claim 8, comprising:
arranging one or more navigational GUI elements proximate to the one or more solar cells having a lower power output than one or more other solar cells.

14. The method of claim 8, comprising:
arranging one or more primary GUI elements away from the one or more solar cells having a lower power output than one or more other solar cells.

15. A system, comprising:
an enclosure;
a plurality of solar cells included in a computing device;
a power management module operative to manage a power output received from the plurality of solar cells, the power management module to form first and second subsets of the plurality of solar cells, and to couple a power output received from the first subset to a first component of the computing device and a power output received from the second subset to a second component of the computing device; and
an interface management module operative to identify one or more solar cells in the first subset having a lower power output than one or more other solar cells in the second subset and to adjust one or more graphical user interface (GUI) elements based on the identification of the one or more solar cells having lower power output and based on a set of rules established by a user specifying types of GUI elements to adjust, the power management module to add at least one of the one or more other solar cells in the second subset to the first subset of the plurality of solar cells to power the first component based on the identification of the one or more solar cells in the first subset having lower power output.

16. The system of claim 15, comprising:
a digital display, one or more of the plurality of solar cells arranged proximate to the digital display.

17. The system of claim 16, the interface management module operative to adjust a graphical user interface (GUI) element for a GUI view presented on the digital display or to adjust one or more system parameters based on the identified one or more solar cells having a lower power output than one or more other solar cells.

18. The system of claim 15, comprising:
an energy storage device, the power management module operative to couple the power output received from the first subset to the energy storage device; and
one or more peripheral devices, the power management module operative to couple the power output received from the second subset to at least one of the one or more peripheral devices.

* * * * *